(12) United States Patent
Ohno

(10) Patent No.: US 7,817,548 B2
(45) Date of Patent: Oct. 19, 2010

(54) TRAFFIC ARBITRATION

(75) Inventor: Osamu Ohno, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 585 days.

(21) Appl. No.: 11/380,557

(22) Filed: Apr. 27, 2006

(65) Prior Publication Data
US 2006/0193324 A1  Aug. 31, 2006

Related U.S. Application Data

(63) Continuation of application No. 09/946,472, filed on Sep. 6, 2001, now Pat. No. 7,065,049.

(30) Foreign Application Priority Data
Sep. 13, 2000  (JP) ............................. 2000-277412

(51) Int. Cl.
*H04J 3/14* (2006.01)
(52) U.S. Cl. ...................................... 370/232; 370/230
(58) Field of Classification Search .............. 370/395.2, 370/395.21, 465, 468, 252–253, 230, 385.21, 370/232, 230.1
See application file for complete search history.

(56) References Cited

U.S. PATENT DOCUMENTS

| 5,130,983 | A  | * | 7/1992  | Heffner, III ................. 370/449 |
| 5,265,207 | A  | * | 11/1993 | Zak et al. ...................... 712/15 |
| 5,301,333 | A  | * | 4/1994  | Lee ............................. 710/244 |
| 6,198,723 | B1 | * | 3/2001  | Parruck et al. ............ 370/230.1 |
| 6,556,571 | B1 | * | 4/2003  | Shahrier et al. .......... 370/395.4 |
| 6,556,578 | B1 | * | 4/2003  | Silberschatz et al. ........ 370/412 |
| 7,046,685 | B1 | * | 5/2006  | Matsuoka et al. .......... 370/409 |
| 7,065,049 | B2 | * | 6/2006  | Ohno ........................ 370/232 |
| 7,173,931 | B2 | * | 2/2007  | Chao et al. .................. 370/388 |
| 7,688,815 | B2 | * | 3/2010  | Bialkowski et al. ........ 370/388 |

(Continued)

FOREIGN PATENT DOCUMENTS

| JP | 2797989     | 7/1998 |
| JP | 10-224364   | 8/1998 |
| JP | 11-191774   | 7/1999 |
| JP | 2001-16206  | 1/2001 |

OTHER PUBLICATIONS

Continuous routing in packet switches; MD Grammatikakis, E Fleury, M Kraetzl—1998.*

(Continued)

*Primary Examiner*—Salman Ahmed
(74) *Attorney, Agent, or Firm*—Harrity & Harrity, LLP

(57) ABSTRACT

The invention provides an arbitration method and an arbiter circuit by which equal arbitration of output cells can be achieved with a comparatively simple configuration even where a very great number of queues are involved. The arbiter circuit includes a plurality of queues for storing output cells, and a plurality of round robins for successively providing the right of outputting output cells to the queues. The round robins are arranged in a multi-stage tree link configuration, and the queues are distributed under those of the round robins which are in the lowest order stage. Each of the round robins in the lowest order stage has a rate information holding function of holding rate information representative of a rate of cells inputted thereto. Meanwhile, each of the round robins in the higher order stage or stages has a rate information holding function of holding rate information regarding those of the round robins which are subordinate to the round robin and a subordinate selection function of selecting one of the subordinate round robins based on the rate information of the subordinate round robins. A queue is added as a subordinate to the selected round robin in the lowest order stage when a connection is to be added newly.

12 Claims, 8 Drawing Sheets

U.S. PATENT DOCUMENTS

| | | | |
|---|---|---|---|
| 2002/0031138 A1* | 3/2002 | Ohno | 370/412 |
| 2002/0057680 A1* | 5/2002 | Ofek et al. | 370/372 |
| 2002/0061028 A1* | 5/2002 | Chao et al. | 370/417 |
| 2002/0075884 A1* | 6/2002 | Wellen | 370/414 |
| 2002/0110135 A1* | 8/2002 | Oki et al. | 370/412 |
| 2002/0176431 A1* | 11/2002 | Golla et al. | 370/412 |
| 2003/0021266 A1* | 1/2003 | Oki et al. | 370/388 |
| 2003/0223420 A1* | 12/2003 | Ferolito | 370/389 |
| 2004/0210688 A1* | 10/2004 | Becker | 710/58 |
| 2006/0047842 A1* | 3/2006 | McElwain | 709/231 |
| 2006/0165098 A1* | 7/2006 | Varma | 370/397 |
| 2006/0165111 A1* | 7/2006 | Varma | 370/428 |
| 2006/0193324 A1* | 8/2006 | Ohno | 370/395.1 |
| 2006/0204170 A1* | 9/2006 | Igarashi et al. | 385/24 |
| 2009/0160686 A1* | 6/2009 | Wong et al. | 341/81 |

OTHER PUBLICATIONS

Crossbar Arbitration in Interconnection Networks for Multiprocessors and Multicomputers; HC Chi—1994.*

Artificial neural net applications in telecommunication systems; Journal Neural Computing & Applications; Publisher Springer London; ISSN 0941-0643 (Print) 1433-3058 (Online); Issue vol. 1, No. 2 / Jun. 1993.*

Multi-tera-bit/s switch based on burst transfer and independent shared buffers; Beshai, M.; Munter, E.; Global Telecommunications Conference, 1995.*

Manabu Yoshino, "Research into the Zone Guarantee-Type Packet Readout Circuit Structure Method", Institute of Electronics, Information, and Communication Engineers, Technical Reports, Japan, Institute of Electronics, Information, and Communication Engineers, Ltd., Jun. 25, 1998, vol. 98, No. 147, pp. 7-12.

* cited by examiner

FIG. 4

|  | RATE OF INPUTTED CELLS | SUBORDINATE RR OF LOWEST RATE | SUBORDINATE RR OF SECOND LOWEST RATE |
|---|---|---|---|
| RR1 | 425Mbps | RR2-1 | RR2-4 |
| RR2-1 | 78Mbps | RR3-1 | RR3-3 |
| RR3-1 | 12Mbps | — | — |
| RR3-2 | 39Mbps | — | — |
| RR3-3 | 27Mbps | — | — |
| RR2-2 | 122Mbps | OMITTED | OMITTED |
| RR2-3 | 145Mbps | OMITTED | OMITTED |
| RR2-4 | 80Mbps | OMITTED | OMITTED |

FIG. 5

|  | RATE OF INPUTTED CELLS | SUBORDINATE RR OF LOWEST RATE | SUBORDINATE RR OF SECOND LOWEST RATE |
|---|---|---|---|
| RR1 | 430Mbps | RR2-4 | RR2-1 |
| RR2-1 | 83Mbps | RR3-1 | RR3-3 |
| RR3-1 | 17Mbps | — | — |
| RR3-2 | 39Mbps | — | — |
| RR3-3 | 27Mbps | — | — |
| RR2-2 | 122Mbps | OMITTED | OMITTED |
| RR2-3 | 145Mbps | OMITTED | OMITTED |
| RR2-4 | 80Mbps | OMITTED | OMITTED |

FIG. 6

|  | RATE OF INPUTTED CELLS | SUBORDINATE RR OF LOWEST RATE | SUBORDINATE RR OF SECOND LOWEST RATE |
|---|---|---|---|
| RR1 | 405Mbps | RR2-1 | RR2-4 |
| RR2-1 | 58bps | RR3-1 | RR3-2 |
| RR3-1 | 12Mbps | — | — |
| RR3-2 | 19Mbps | — | — |
| RR3-3 | 27Mbps | — | — |
| RR2-2 | 122Mbps | OMITTED | OMITTED |
| RR2-3 | 145Mbps | OMITTED | OMITTED |
| RR2-4 | 80Mbps | OMITTED | OMITTED |

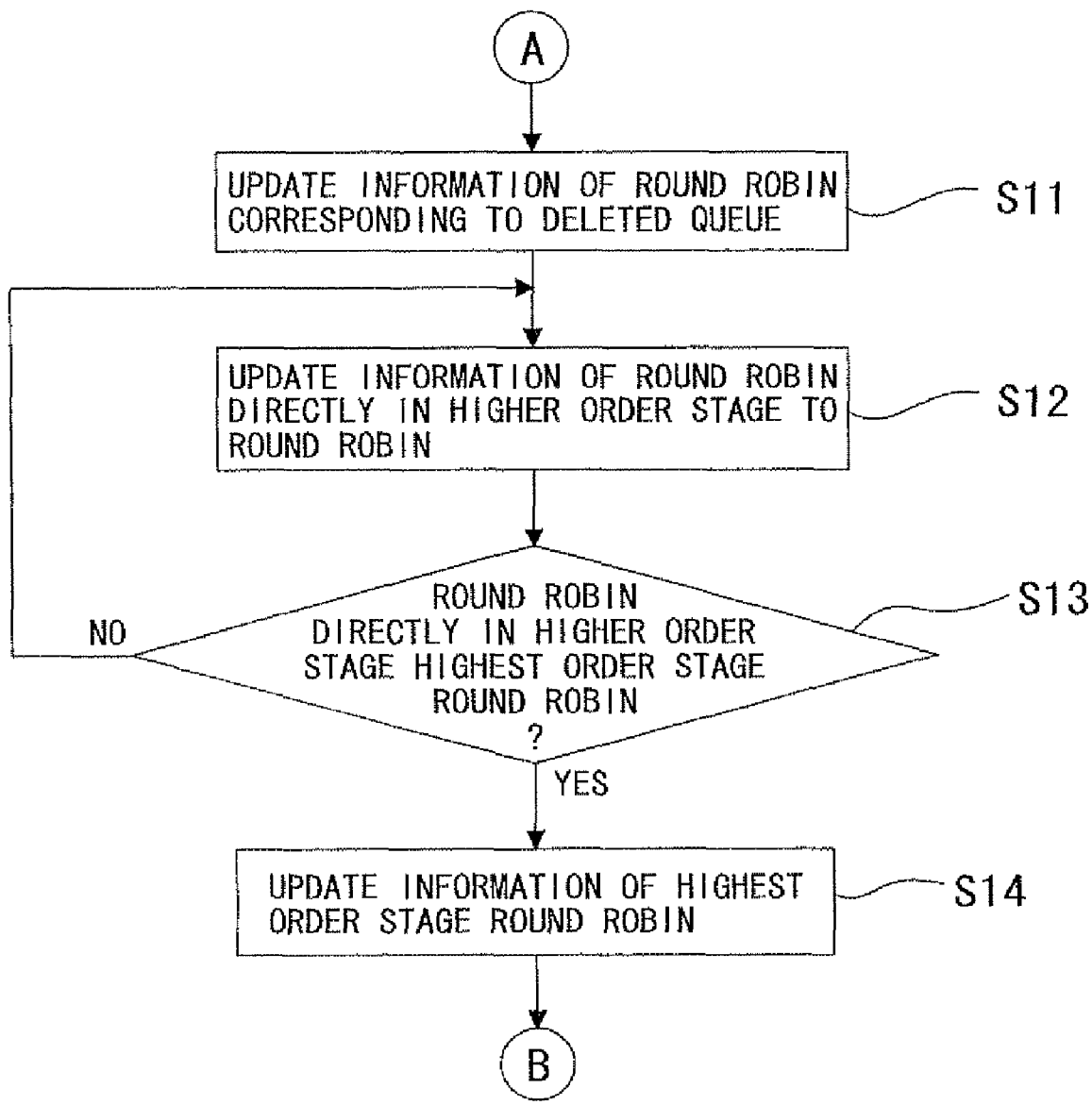

TRAFFIC ARBITRATION

BACKGROUND OF THE INVENTION

1. Field of the Invention

This invention relates to queuing for each virtual channel (VC) in an asynchronous transfer mode (ATM) exchange, and more particularly to an Arbitration method for output cells of an ATM and an arbiter circuit.

2. Description of the Related Art

Conventionally, an ATM exchange adopts a method of storing cells of each virtual channel into an individual queue (per-VC queuing) in order to achieve fine traffic control.

The per-VC queuing method is used also for VC merging and so forth when MPLS (Multi-Protocol Label Switching) is incorporated in an ATM exchange.

Such queuing for each virtual channel of an ATM exchange as described above is disclosed, for example, in Japanese Patent Laid-Open Nos. 224364/1998 and 191774/1999 and Japanese Patent No. 2797989. Japanese Patent No. 2797989 discloses a cell traffic shaper which queues cells into a cell buffer for each logically multiplexed connection or connection group and controls the output cell rate from each queue using a plurality of timers. When a first cell is stored into a queue, a corresponding timer is assigned to the queue and set, and if the queue becomes empty, then the setting of the timer is cancelled so that the timer is released from the queue.

However, while use of the "per-VC queuing" method makes traffic control for each VC possible, there is the possibility that a very great number of queues such as several tens thousands queues may be involved.

This gives rise to a problem that a long processing time for arbitration is required for the output and processing may not be completed within a fixed period of time.

SUMMARY OF THE INVENTION

It is an object of the present invention to provide an arbitration method and an arbiter circuit by which equal arbitration of output cells can be achieved with a comparatively simple configuration even where a very great number of queues are involved.

Generally, arbitration methods are divided into (a) a method wherein the degrees of priority are determined fixedly (statically) among different service classes and (b) another method wherein cells are outputted equally within the same service class.

In the arbitration method (a) described above, the degrees of priority among different service classes are fixed, and while cells of the highest degree of priority remain stored, cells of a lower degree of priority are not outputted at all. This makes it possible to assure the delay characteristic of cells of the highest degree of priority.

In the arbitration method (b), it is required that cells be outputted equally from all queues. Usually, a round robin is used to make it possible to provide the right of outputting cells successively to different queues and assign the right to a next queue if no cell is stored in the pertaining queue. However, where the "per-VC queuing" is used, there is the possibility that the number of queues of the same service class may reach several tens thousands and time required for necessary processing may not be assured.

This problem can be solved if a time wheel can be used to dynamically control the band in place of a round robin. In this instance, however, complicated closed loop control for the entire system including the input side is required.

According to the present invention, the equality among different queues where a great number queues are involved in the arbitration method (b) in the same service class is assured by a simple method which uses a round robin without using a closed loop of an entire system including inputs and outputs.

However, where a round robin is used, if it is assumed that cells from queues of comparatively high input cell rates are inputted in a concentrated manner to a first round robin while cells from a queue of a high input cell rate and other queues of very low input rates are inputted to a second round robin, then if the sum total of input rates exceed the output rate because of congestion, then although the input rate is equal, the output rate of the queues of the second round robin becomes higher than that of the queues of the first round robin. Consequently, the equality in output among the queues is lost.

Therefore, in order to eliminate the problem just described, according to the present invention, the input rates to different round robins are adjusted so as to be equal to one another.

In particular, in order to attain the object described above, according to an aspect of the present invention, there is provided an arbitration method for output cells of an ATM, comprising the steps of causing each of a plurality of round robins, which are arranged in a multi-stage tree link configuration and successively provide the right of outputting output cells to a plurality of queues which store output cells, to have rate information representative of a rate of cells inputted to the round robin, and successively selecting, based on the rate information of the round robins, a round robin in each of the stages from the highest order stage to the lowest order stage to determine that one of the round robins in the lowest order stage to which a queue is to be arranged.

According to another aspect of the present invention, there is provided an arbiter circuit for output cells of an ATM, comprising a plurality of queues for storing output cells, and a plurality of round robins for successively providing the right of outputting output cells to the queues., the round robins being arranged in a multi-stage tree link configuration, the queues being distributed under those of the round robins which are in the lowest order stage, each of the round robins in the lowest order stage having a rate information holding function of holding rate information representative of a rate of cells inputted thereto, each of the round robins in the higher order stage or stages having a rate information holding function of holding rate information regarding those of the round robins which are subordinate to the round robin and a subordinate selection function of selecting one of the subordinate round robins based on the rate information of the subordinate round robins, a queue being added as a subordinate to the selected round robin in the lowest order stage when a connection is to be added newly.

In both of the arbitration method and the arbiter circuit, preferably a round robin having the lowest rate is successively selected from among the round robins of each of the stages from the highest order stage to the lowest order stage and a queue is added as a subordinate to the selected round robin in the lowest order stage.

The rate information of each of the selected round robins may be updated in response to a variation of the rate caused by the added queue.

Preferably, each of those of the round robins which have subordinate round robins has identification information indicative of those of the subordinate round robins which have the lowest rate and the second lowest rate, and after the rate information with regard to the subordinate round robin having the lowest rate is updated in response to a variation of the rate caused by the added queue, the updated rate is compared to determine whether or not it is necessary to update the identification information.

The rate information may be produced based on information applied when a connection is established.

If a connection is deleted with regard to a queue, then the rate information in each of those of the round robins which are successively linked to the queue may be successively updated from the lowest order stage round robin to the highest order stage round robin in accordance with a rate of the deleted queue.

Preferably, each of those of the round robins which have subordinate round robins has identification information indicative of those of the subordinate round robins which have the lowest rate and the second lowest rate, and after the rate information with regard to the subordinate round robin having the lowest rate is updated in response to a variation of the rate caused by the deleted queue, the updated rate is compared to determine whether or not it is necessary to update the identification information.

With the arbitration method and the arbiter circuit, since the multi-stage arrangement of round robins and the averaging of the traffics to the round robins are used, even if a very great number of queues are involved in "per-VC queuing", equal arbitration can be achieved. Further, due to the averaging of the traffics, the advantage just described above can be anticipated also upon congestion. Furthermore, the advantage described can be obtained with a comparatively simple configuration without using a combination of the closed loop control of the entire apparatus and the time wheel.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 4 is a table illustrating information possessed by each round robin shown in FIG. 3;

FIG. 5 is a similar view but illustrating information possessed by each round robin shown in FIG. 3 after a connection is added;

FIG. 6 is a similar view but illustrating information possessed by each round robin shown in FIG. 3 after a connection is deleted; and FIGS. 7 and 8 are flow charts illustrating an information updating process of the arbiter circuit of FIG. 3 after addition or deletion of a connection.

DESCRIPTION OF THE PREFERRED EMBODIMENT

Figure 1:
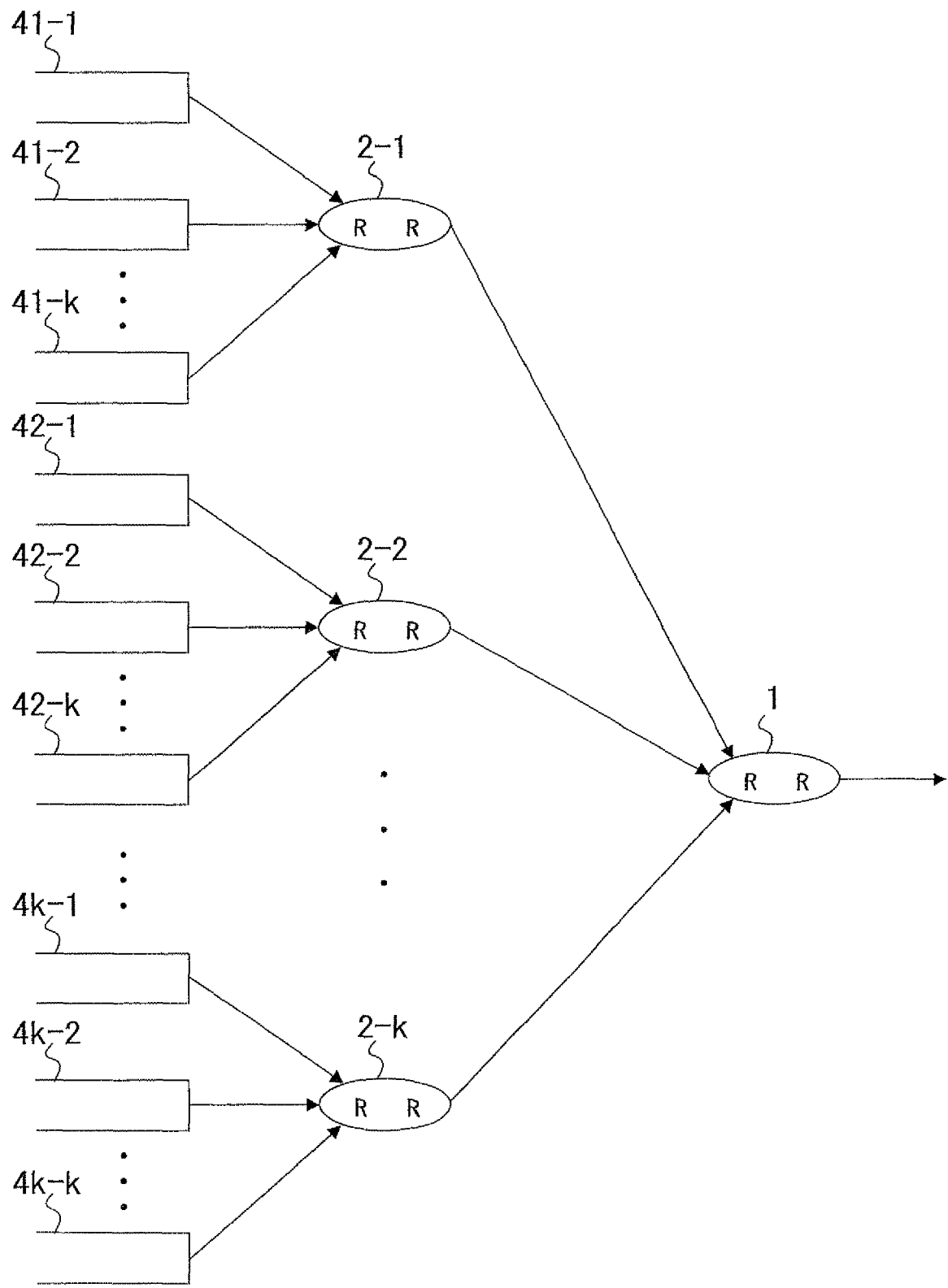
FIG. 1 is a block diagram showing a configuration of an arbiter circuit to which the present invention can be applied.

Referring first to FIG. 1, there is shown a configuration of an arbiter circuit to which the present invention can be applied. The arbiter circuit shown includes a plurality of round robins (RR) 1 and 2-1 to 2-k connected in a tree link configuration of a plurality of stages and each having a number of inputs connected thereto such that the round robin can process the inputs sufficiently within a required period of time.

In particular, the round robins 2-1 to 2-k are disposed as subordinates to the round robin 1 of the highest order stage, and queues 41-1 to 41-k, 42-1 to 42-k, . . . , and 4k-1 to 4k-k are disposed as subordinates to the round robins 2-1 to 2-k of the lowest order.

With the configuration described, the right for outputting cells can be provided equally to the queues 41-1 to 41-k, 42-1 to 42-k, . . . , and 4k-1 to 4k-k which input cells to the round robins 2-1 to 2-k. However, if congestion occurs, then there is the possibility that the equality among the queues 41-1 to 41-k, 42-1 to 42-k, . . . , and 4k-1 to 4k-k may be lost.

Figure 2:
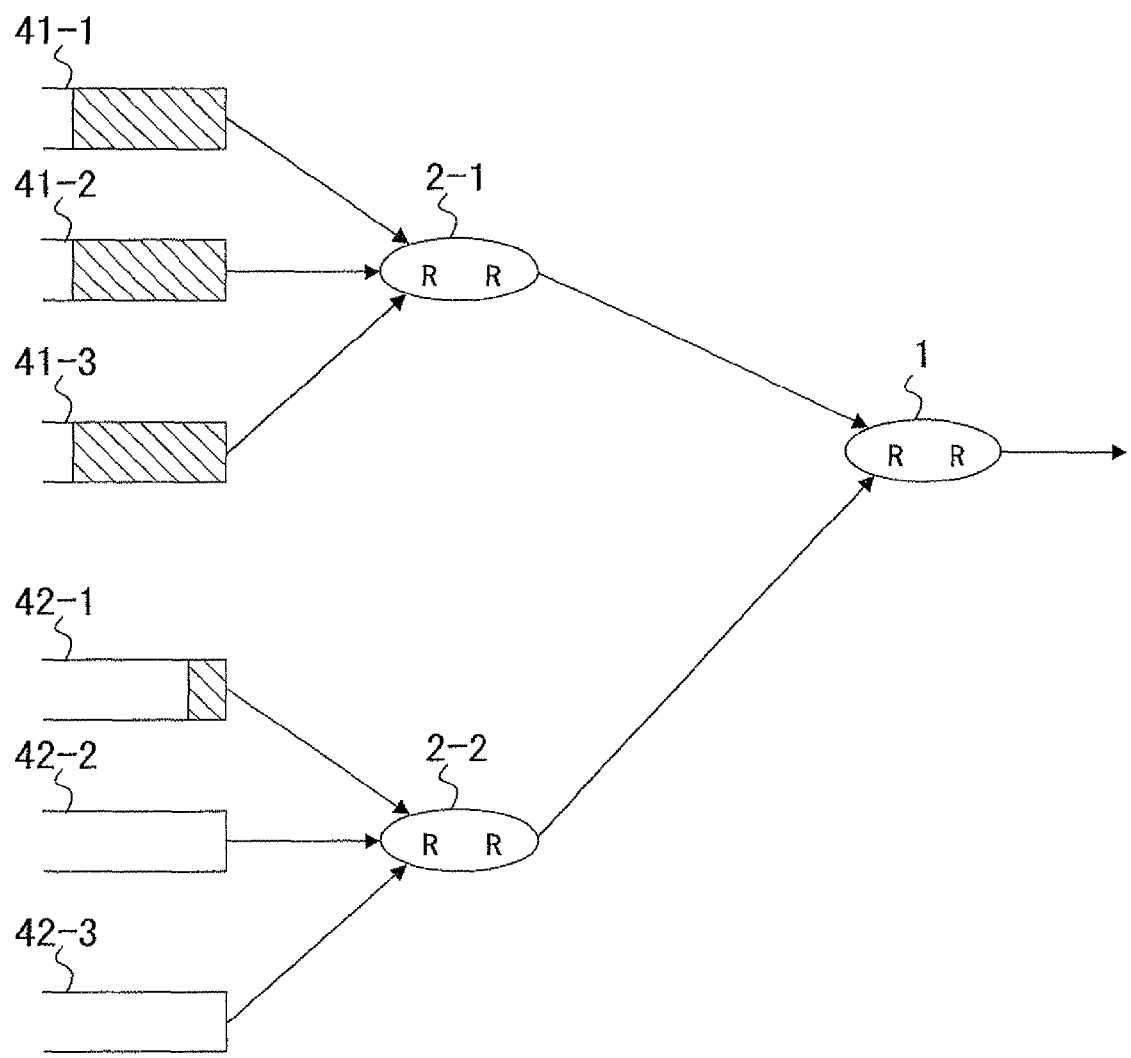
FIG. 2 is a similar view but illustrating a problem which occurs when the arbiter circuit of FIG. 1 temporarily suffers from traffic congestion.

FIG. 2 illustrates a problem when congestion temporarily occurs with the configuration of the arbiter circuit shown in FIG. 1. Referring to FIG. 2, it is assumed that cells from the queues 41-1 to 41-3 of a comparatively high input cell rate are inputted in a concentrated manner to the round robin 2-1 while cells from the queue 42-1 of a high input cell rate (equal to that of the queues 41-1 to 41-3) and cells from the queues 42-2 to 42-3 of different very low cell rates are inputted to the round robin 2-2.

If the total cell rate becomes higher than the input cell rate as a result of congestion, then the output rate of queue 42-1 becomes higher than that of the queues 41-1 to 41-3 although the input rate is equal, resulting in loss of the equality in output among the queues 42-1 to 42-3.

In order to overcome the problem just described, or in other words, in order to adjust the input rates to the individual round robins so as to be equal to one another, the arbiter circuit according to the present invention provides each round robin with rate information representative of the rate of cells inputted thereto, successively selects, based on the rate information of the round robins, a round robin in each of the stages from the highest order stage to the lowest order stage, and adds a queue as a subordinate to the selected one of the round robins which is in the lowest order stage.

Further, the arbiter circuit provides each of those of the round robins which have subordinate round robins with identification information indicative of those of the subordinate round robins which have the lowest rate and the second lowest rate, and compares, after the rate information with regard to the subordinate round robin having the lowest rate is updated in response to a variation of the rate caused by the added queue, the updated rate to determine whether or not it is necessary to update the identification information. The rate information and the identification information are produced based on information applied when a connection is established.

When a connection is to be established newly, that one of the subordinate round robins to the highest order stage round robin which has the lowest input rate is selected based on information of the highest order stage round robin. Then, based on the information possessed by the selected round robin, that one of the round robins subordinate to the selected round robin which has the lowest input rate is selected.

By repeating such selection of a round robin up to the last stage and arranging a queue as a subordinate to the selected round robin in the last stage, queues are arranged so that the rates of cells inputted to the individual round robins may become as equal as possible.

Now, an arbiter circuit to which the present invention is applied is described in detail with reference to FIGS. 3 to 8.

In the following description, it is assumed that, for simplified illustration and description, the number of stages of round robins is 3 and the highest order stage round robin is denoted by reference numeral 1. Further, round robins 2-1 to 2-4 are arranged as subordinates to the round robin 1, and round robins 3-1 to 3-3 are arranged under the round robin 2-1. It is to be noted that round robins under the round robins 2-2 to 2-4 are omitted in FIG. 3.

Figure 3:
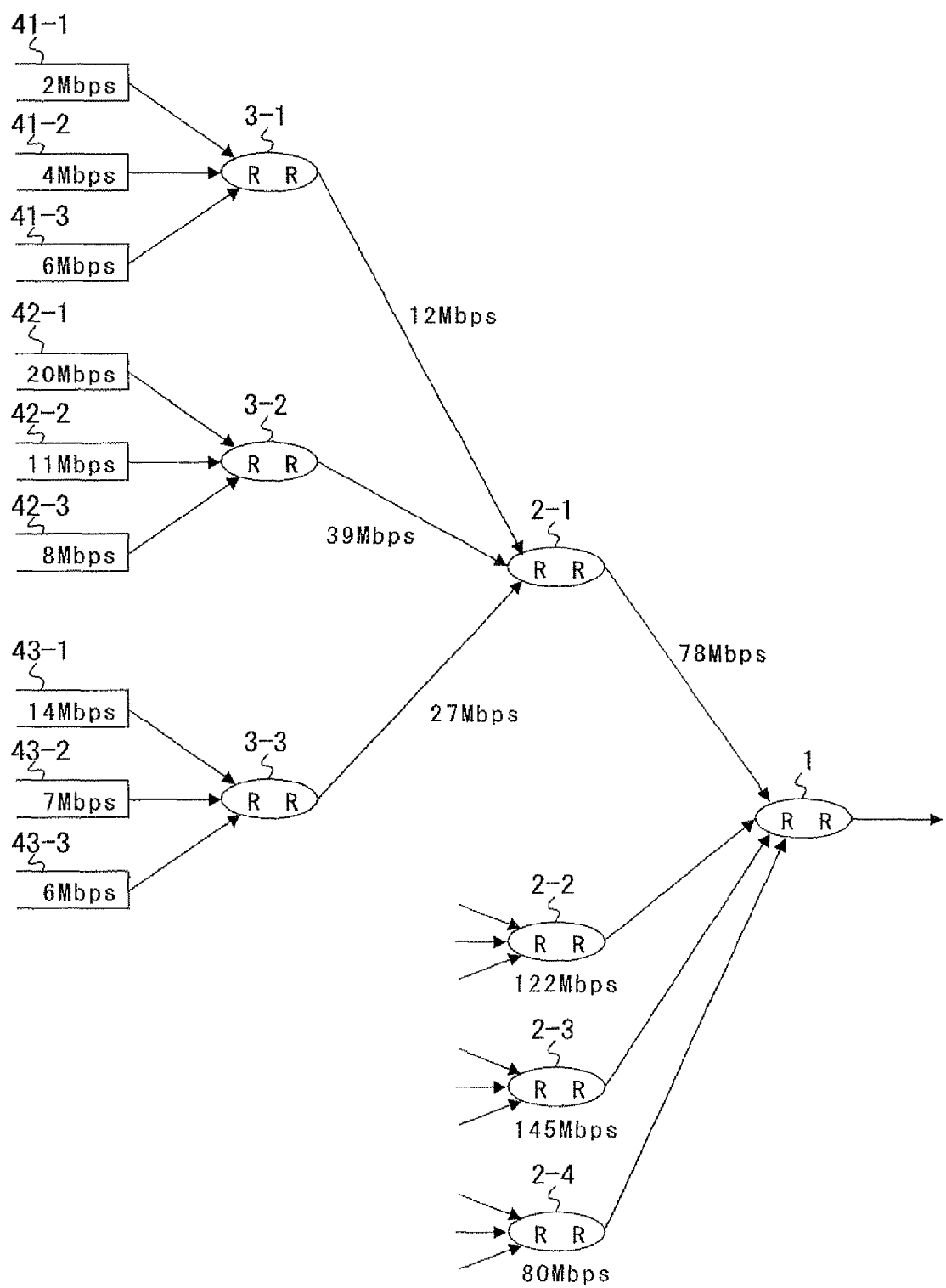
FIG. 3 is a similar view but showing a configuration of an arbiter circuit to which the present invention is applied.

Meanwhile, queues for storing cells of individual virtual channels (VCs) are arranged as subordinates to the round robins 3-1 to 3-3 in the lowest order stage, and the virtual channels have such cell rates as illustrated in FIG. 3. In particular, the rates of the queues 41-1 to 41-3 are 2, 4 and 6 Mbps, respectively, and therefore, the total rate of the round robin 3-1 is 12 Mbps.

Meanwhile, the rates of the queues 42-1 to 42-3 are 20, 11, 8 Mbps, respectively, and therefore, the total rate of the round robin 3-2 is 39 Mbps. The rates of the queues 43-1 to 43-3 are 14, 7 and 6 Mbps, respectively, and therefore, the total rate of the round robin 3-3 is 27 Mbps.

Each of the round robins 1, 2-1 to 2-4 and 3-1 to 3-3 has information of an input cell rate and those ones of the round robins subordinate to the round robin which have the lowest rate and the second lowest rate as seen from FIG. 4.

Now, operation of the arbiter circuit of FIG. 3 after addition or deletion of a connection and updating of information of the round robin 1, 2-1 to 2-4, and 3-1 to 3-3 are described with reference to FIGS. 3 to 8.

Figure 7:
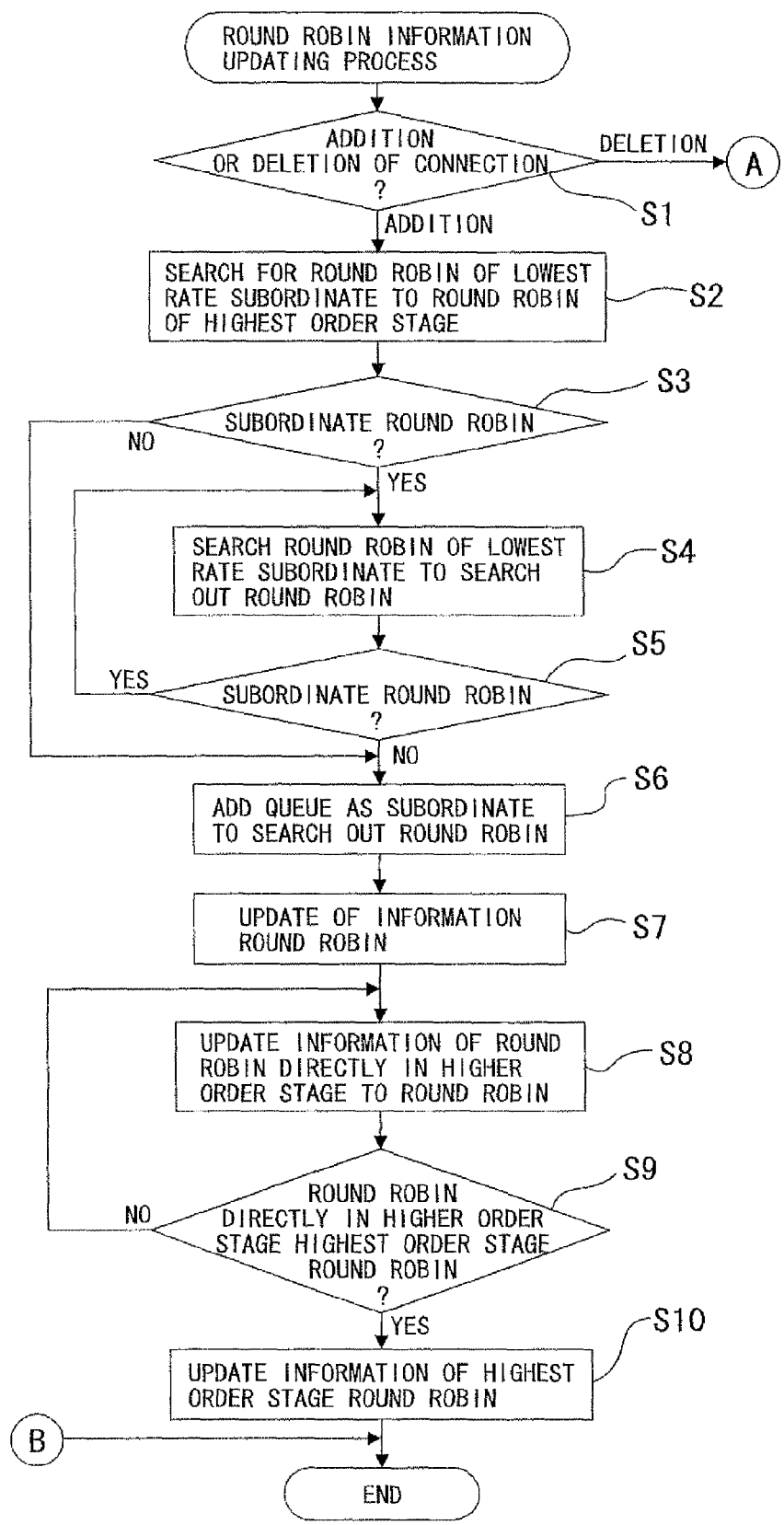

When a connection of the rate of 5 Mbps is to be added (step S1 of FIG. 7), that one of the round robins subordinate to the round robin 1 of the highest order stage which has the lowest rate is searched for (step S2 of FIG. 7). Then, it is discriminated whether or not the round robin searched out by the search has robins subordinate thereto (step S3 of FIG. 7). If robins subordinate to the searched out round robin are detected, then the processing advances to step S4 of FIG. 7, but in another other case, the processing advances to step S6 of FIG. 7.

In the case described above, the round robin 2-1 is searched out, and the thus searched out round robin 2-1 has the round robins 3-1 to 3-3 subordinate thereto as seen in FIG. 4. Therefore, that one of the round robins subordinate to the round robin 2-1 which has the lowest rate is searched for (step S4 of FIG. 7). Then, it is discriminated whether or not the round robin searched out by the search has round robins subordinate thereto (step S5 of FIG. 7). If round robins subordinate to the searched out round robin are detected, then the processing advances to step S4 of FIG. 7, but in another other case, the processing advances to step S6 of FIG. 7.

In this instance, the round robin 3-1 is searched out. However, since the round robin 3-1 does not have round robins subordinate thereto as seen in FIG. 4, a queue 41-4 (not shown) is added as a subordinate to the round robin 3-1 so that cells of the new connection can be stored (step SG of FIG. 7).

After the queue 41-4 is added, the information of the round robin 3-1 is updated (step S7 of FIG. 7). In this instance, the information of the round robin 3-1 changes to 17 Mbps by addition of the cell rate of 5 Mbps added newly to the cell rate of 12 Mbps at present (refer to FIG. 5).

Then, the information of the round robin 2-1 of the immediately higher order stage to the round robin 3-1 is updated (step S8 of FIG. 7). In this instance, the information of the round robin 2-1 is updated after the information updated in step S6 is compared with the cell rate of 27 Mbps of the round robin 3-3 which has the second lower rate among the subordinate round robins to the round robin 2-1.

Since the comparison reveals that the information of the round robin 3-1 (updated to 17 Mbps) is lower than the cell rate of the round robin 3-3 (27 Mbps), the round robin of the lowest rate and the round robin of the second lowest rate in the information of the round robin 2-1 are not changed. Meanwhile, the cell rate of the information of the round robin 2-1 changes to 83 Mbps by addition of the added cell rate of 5 Mbps to the current cell rate of 78 Mbps (refer to FIG. 5).

Thereafter, it is determined whether or not the round robin in the immediately higher order stage to the round robin whose information has been updated is the highest order stage round robin (step S9 of FIG. 7). If the round robin in the immediately higher order stage is not the highest order stage round robin, then the processing returns to step S8, but if the round robin in the immediately higher order stage is the highest order stage round robin, then the processing advances to step S10.

In this instance, since the round robin 1 in the immediately higher order stage to the round robin 2-1 whose information has been updated is the highest order stage round robin, the information of the round robin 1 is updated (step S10 of FIG. 7). In this instance, the information is updated after the information updated in step S8 is compared with the cell rate of 80 Mbps of the round robin 2-4 which has the second lowest rate among the round robins subordinate to the round robin 1.

Since the comparison reveals that the cell rate of the round robin 2-1 (updated to the 83 Mbps) is higher than the cell rate of the round robin 2-4 (80 Mbps), the information of all of the round robins 2-1 to 2-4 subordinate to the round robin 1 is referred to and the round robin of the lowest rate is updated to the round robin 2-4 while the round robin of the second lowest rate is updated to the round robin 2-1. Further, in the information of the round robin 1, the cell rate is updated to 430 Mbps by addition of the added cell rate of 5 Mbps to the cell rate of 425 Mbps at present. The information of the round robins 1, 2-1 to 2-4 and 3-1 to 3-3 after such addition of the new connection is completed as described above is illustrated in FIG. 5.

On the other hand, if the connection of the queue 42-1 is to be deleted (step S1 of FIG. 7), then the information of the round robin 3-2 connecting to the deleted queue is updated (step S11 of FIG. 8). In the information of the round robin 3-2, the cell rate is updated to 19 Mbps by subtraction of the rate of 20 Mbps of the queue 42-1 from the cell rate of 39 Mbps at present.

Then, the information of the round robin 2-1 in the immediately higher order stage to the round robin 3-2 is updated (step S12 of FIG. 8). In this instance, the information is updated after the rate updated in step S11 is compared with the rate of 12 Mbps of the round robin 3-1 which has the lowest rate among the round robins subordinate to the round robin 2-1 Since the comparison reveals that the rate of the round robin 3-2 (updated to 19 Mbps) is lower than the rate of the round robin 3-1 (12 Mbps), the round robin of the lowest rate in the information of the round robin 2-1 is not changed.

Further, the rate updated in step S11 is compared with the rate of 27 Mbps of the round robin 3-3 which has the second lowest rate among the round robins subordinate to the round robin 2-1. Since the rate of the round robin 3-2 (updated to 19 Mbps) is lower than the rate of the round robin 3-3 (27 Mbps), the round robin of the second lowest rate is updated to the round robin 3-2. Further, in the information of the round robin 2-1, the rate is updated to 58 Mbps by subtraction of the rate of 20 Mbps of the queue 42-1 from the cell rate of 78 Mbps at present.

Thereafter, it is discriminated whether or not the round robin in the immediately higher order stage to the round robin whose information has been updated is the highest order stage round robin (step S13 of FIG. 8). If the round robin in the immediately higher order stage is not the highest order stage round robin, then the processing returns to step S12, but if the round robin in the immediately higher order stage is the highest order stage round robin, then the processing advances to step S14.

In this instance, since the round robin 1 in the immediately higher order stage to the round robin 2-1 whose information has been updated is the highest order stage round robin, the information of the round robin 1 is updated (step S14 of FIG. 8). In this instance, since the round robin which has the lowest rate among the round robins subordinate to the round robin 1 is the round robin 2-1 (refer to FIG. 4), updating of the information is not performed. Further, in the information of the round robin 1, the cell rate is updated to 405 Mbps by subtraction of the deleted rate of 20 Mbps from the cell rate of 425 Mbps at present. The information of the round robins 1, 2-1 to 2-4 and 3-1 to 3-3 after such deletion of the connection is completed is illustrated in FIG. 6.

Addition and deletion of a connection are performed in such procedures as described above. According to the method described above, the traffics of the round robins 1, 2-1 to 2-4 and 3-1 to 3-3 can be averaged comparatively simply, and even if the number of queues increases in the per-VC queuing, equal arbitration can be performed.

By such a multi-stage arrangement of round robins and averaging of the traffics to the round robins as described above, even if a very great number of queues are involved in "per-VC queuing", equal arbitration can be achieved.

Further, by the averaging of the traffics to the round robins 1, 2-1 to 2-4 and 3-1 to 3-3, the advantage described above can be anticipated also upon congestion. Furthermore, the advantage described above can be obtained with a comparatively simple configuration without using a combination of the closed loop control of the entire apparatus and the time wheel.

It is to be noted that, in order to further augment the equality of outputs of the individual queues, it is necessary to calculate rates of all queues and re-distribute the rates to the round robins every time a new connection is added or a connection is deleted However, for the sake of simplification of the system, the system of the present invention does not employ a configuration for such calculation and re-distribution of rates.

While a preferred embodiment of the present invention has been described using specific terms, such description is for illustrative purposes only, and it is to be understood that changes and variations may be made without departing from the spirit or scope of the following claims.

What is claimed is:

1. An apparatus comprising:
   groups of storage members having an associated output rate; and
   a hardware-implemented arbiter circuit including sets of arbitration members linked in multi-stage subordinate-superior relation to arbitrate data transfer from the storage members,
      where one of the sets of the arbitration members includes first arbitration members to respectively connect to the storage members of one of the groups, each first arbitration member having an associated transfer rate corresponding to a sum of the output rates associated with the storage members of the group to which the first arbitration member connects,
      where one or more other sets of the arbitration members includes arbitration members that are superior to the first arbitration members and have an associated transfer rate corresponding to a sum of the transfer rates associated with immediately subordinate arbitration members and have information identifying a rank order of a first one of the immediately subordinate arbitration members, having a lowest associated transfer rate among transfer rates of the immediately subordinate arbitration members, and a second one of the immediately subordinate arbitration members, having a lowest associated transfer rates among the transfer rates of immediately subordinate arbitration members, and
      where the superior arbitration members successively select one of the first immediately subordinate arbitration members or the second immediately subordinate arbitration member having the lowest associated transfer rate, rather than the other one of the first immediately subordinate arbitration members or the second immediately subordinate arbitration member not having the lowest associated transfer rate, based on the information identifying the rank orders.

2. The device of claim 1, where the first arbitration member that, is selected, is to connect to an additional storage member that has an associated additional output rate to increase the transfer rate associated with the selected first arbitration member by an amount of the associated additional output rate.

3. The device of claim 2, where selected superior arbitration members are to update the respective information identifying the rank orders when the rank orders are changed due to increased respective transfer rates by the amount of the associated additional output rate.

4. The device of claim 1, where the first arbitration member, that is selected, is to disconnect from one or more of the storage members to decrease the transfer rate associated with the selected first arbitration member.

5. The device of claim 4, where the selected arbitration members are to update the respective information identifying the rank orders when the rank orders are changed due to the decreased respective transfer rates.

6. An arbitration method performed by an apparatus including a hardware-implemented arbiter circuit including sets of arbitration members linked in multi-stage subordinate-superior relation to arbitrate data transfer from storage members of groups of storage members having an associated output rate, the method comprising:
   respectively connecting first arbitration members of one of the sets of the arbitration members, of the hardware-implemented arbiter circuit, to the storage members of one of the groups, each first arbitration member having an associated transfer rate corresponding to a sum of the output rates associated with the storage members of the group to which the first arbitration member connects, where one or more other sets of the arbitration members, of the hardware-implemented arbiter circuit, includes arbitration members that are superior to the first arbitration members and have an associated transfer rate corresponding to a sum of the transfer rates associated with immediately subordinate arbitration members and have information identifying a rank order of a first one of the immediately subordinate arbitration members, having a lowest associated transfer rate among transfer rates of the immediately subordinate arbitration members, and a second one of the immediately subordinate arbitration members, having a lowest associated transfer rates among the transfer rates of immediately subordinate arbitration members; and
   successively selecting, by the superior arbitration members, one of the first immediately subordinate arbitration members or the second immediately subordinate arbitration member having the lowest associated transfer rate, rather than the other one of the first immediately subordinate arbitration members or the second immediately subordinate arbitration member not having the lowest associated transfer rate, based on the information identifying the rank orders.

7. The arbitration method of claim 6, where the selected first arbitration member connects to an additional storage member that has an associated additional output rate to increase the transfer rate associated with the selected first arbitration member by an amount of the associated additional output rate.

8. The arbitration method of claim 7, where selected superior arbitration members update the respective information identifying the rank orders when the rank orders are changed due to increased respective transfer rates by the amount of the associated additional output rate.

9. The arbitration method of claim 6, where the selected first arbitration member disconnects from one or more of the storage members to decrease the transfer rate associated with the selected first arbitration member.

10. The arbitration method of claim 9, where the selected arbitration members update the respective information identifying the rank orders when the rank orders are changed due to the decreased respective transfer rates.

11. The arbitration method of claim 6, further comprising:
determining whether a state of congestion exists in the arbiter circuit, where the successively selecting is performed upon a determination that the state of congestion exists.

12. The arbitration method of claim 6, further comprising:
anticipating congestion in the arbiter circuit, where the successively selecting begins after the anticipating.

* * * * *